US008370631B2

(12) United States Patent
Pearson

(10) Patent No.: US 8,370,631 B2
(45) Date of Patent: Feb. 5, 2013

(54) TRUSTED IDENTITIES ON A TRUSTED COMPUTING PLATFORM

(75) Inventor: Siani Pearson, Llanvaches (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 3514 days.

(21) Appl. No.: 10/208,716

(22) Filed: Jul. 29, 2002

(65) Prior Publication Data

US 2003/0037233 A1    Feb. 20, 2003

(30) Foreign Application Priority Data

Jul. 30, 2001 (EP) .................................... 01306525

(51) Int. Cl.
*H04L 9/32* (2006.01)
*H04L 9/30* (2006.01)

(52) U.S. Cl. ............... 713/175; 713/156; 726/5; 726/27

(58) Field of Classification Search ................ 726/5, 10, 726/18–19; 713/155–157
See application file for complete search history.

(56) References Cited

U.S. PATENT DOCUMENTS

| | | | | |
|---|---|---|---|---|
| 5,361,359 | A | 11/1994 | Tajalli et al. | 395/700 |
| 5,563,998 | A | 10/1996 | Yaksich | 395/149 |
| 5,664,207 | A | 9/1997 | Crumpler et al. | 395/766 |
| 5,758,257 | A | 5/1998 | Herz et al. | 455/2 |
| 5,805,712 | A | 9/1998 | Davis | 380/50 |
| 5,890,152 | A | 3/1999 | Rapaport et al. | 707/6 |
| 5,903,882 | A * | 5/1999 | Asay et al. | 705/44 |
| 5,982,898 | A * | 11/1999 | Hsu et al. | 713/156 |
| 6,212,634 | B1 | 4/2001 | Geer, Jr. et al. | 713/156 |
| 6,330,670 | B1 | 12/2001 | England et al. | 713/2 |
| 6,519,571 | B1 | 2/2003 | Guheen et al. | 705/14 |
| 6,611,842 | B1 | 8/2003 | Brown | 707/102 |
| 6,711,682 | B1 | 3/2004 | Capps | 713/184 |
| 7,711,951 | B2 * | 5/2010 | Chao | 713/156 |
| 8,064,605 | B2 * | 11/2011 | Brutch et al. | 380/277 |
| 2002/0023059 | A1 * | 2/2002 | Bari et al. | 705/76 |
| 2005/0050367 | A1 * | 3/2005 | Burger et al. | 713/202 |
| 2011/0029769 | A1 * | 2/2011 | Aissi et al. | 713/155 |
| 2012/0054734 | A1 * | 3/2012 | Andrews et al. | 717/171 |

FOREIGN PATENT DOCUMENTS

| | | |
|---|---|---|
| EP | 0 501 697 A | 9/1992 |
| EP | 0 971 303 A2 | 1/2000 |
| FR | 2 733 068 A | 10/1996 |
| WO | 94/23383 A1 | 10/1994 |
| WO | 99/62012 A1 | 12/1999 |
| WO | 00/04673 | 1/2000 |
| WO | 00/48063 | 8/2000 |
| WO | 00/73879 A1 | 12/2000 |
| WO | 01/31841 A | 5/2001 |

(Continued)

OTHER PUBLICATIONS

U.S. Appl. No. 10/110,280, filed Aug. 23, 2002, Chen et al.

(Continued)

*Primary Examiner* — Christopher Revak

(57) ABSTRACT

A trusted certification authority service allows a user to control a combination or a subset of personal credentials associated with different trusted identities of the user to create a new identity that may be used by the user to entitle him to access or obtain a third party service. The copying and/or transfer of trust values (such as bank balances or loyalty points) between different trusted identities in order can maintain the anonymity of a person having one or more of said identities.

20 Claims, 2 Drawing Sheets

FOREIGN PATENT DOCUMENTS

| | | |
|---|---|---|
| WO | 01/43033 A1 | 6/2001 |
| WO | 01/46876 A2 | 6/2001 |
| WO | 01/54346 | 7/2001 |
| WO | WO 01/54346 * | 7/2001 |

OTHER PUBLICATIONS

U.S. Appl. No. 10/241,893, filed Sep. 12, 2002, Pearson.

Anderson, R., et al., "Tamper Resistance—Cautionary Note," *ISENIX Association, Second USENIX Workshop on Electronic Commerce*, pp. 1-11 (Nov. 18-21, 1996).

Chaum, D., "Security without identification: transaction systems to make big brother obsolete," *Communications of the ACM*, vol. 28, No. 10, pp. 1030-1044 (Oct. 1985).

Neuman, B.C., et al., "Kerberos: an authentication service for computer networks," *IEEE Communications Magazine*, vol. 32, No. 9, pp. 33-38 (Sep. 1994).

Tygar, J.D., "Atomicity in electronic commerce,". *Proceedings of the 15th Annual ACM Symposium on Principles of Distributed Computing*, pp. 8-26 (May 23-26, 1996).

Yee, B., "Using Secure Coprocessors," Doctoral thesis—Carnegie Mellon University, pp. 1-94 (May 1994).

"Building a Foundation of Trust in the PC," *Trusted Computing Platform Alliance*, pp. 1-7 (Jan. 2000).

"Information technology—Security techniques—Entity authentication; Part 3: Mechanisms using digital signature techniques," *ISO/IEC 9798-3*, Second Edition, pp. 1-6 (1998).

"Information technology—Security techniques—Key management—Part 3: Mechanisms using asymmetric techniques," *ISO/IEC 11770-3*, pp. 1-34 (1999).

*Trusted Computing Platform Alliance (TCPA), Main Specification*, Version 1.0, pp. 1-284 (2000).

* cited by examiner

TRUSTED IDENTITIES ON A TRUSTED COMPUTING PLATFORM

CROSS REFERENCE TO RELATED APPLICATIONS

The subject matter of the present application may also be related to the following U.S. Patent Applications: "Electronic Commerce System," Ser. No. 10/110,280, filed Aug. 23, 2002; and "Method and Apparatus for User Profiling," Ser. No. 10/241,893, filed Sep. 12, 2002.

BACKGROUND OF THE INVENTION

1. Field of the Invention

This invention relates to trusted identities on a trusted computing platform, in particular, to a method of creating trusted identities on a trusted computing platform.

2. Description of Related Art

Application WO 00/48063 of the present applicant discloses a security solution to allow a user of a trusted computing platform (TCP) to check the integrity of that platform That prior application is incorporated herein by reference. That application also discloses the possibility of providing multiple platform identities consisting of a cryptographic key and digital certificate. A platform may have several identities, which might be used for interactions with different parties. Each platform in a transaction can check the other's identity to verify that the other is a TCP and is working as expected. In the TCP specification disclosed above such multiple identities remain completely separate. The multiple identities, consisting of a cryptographic key and certificate are known as labels. For each label which is created, a trusted device (TD) in the user's trusted platform generates a public/private key pair for use with the new identity/label.

For an entity of any kind (such as a computing platform, identity or service) to be trusted, in this context, means that a third party can have some level of confidence that the entity has a stated identity, is not subject to unauthorised modification, or both. In the case of a trusted device, this is achieved by physical and logical isolation from other functional elements of a computing platform—communication with the trusted device is controlled in such a manner that communications received by the trusted device will not subvert it and that communications received from the trusted device can themselves be trusted.

BRIEF SUMMARY OF THE INVENTION

The inventive insight of the present applicant has determined that a technical problem exists in how a trusted service may be provided in order to allow a user of a TCP to control, amend or create a trusted user identity having a combination or subset of personal data associated with that particular user.

According to a first aspect of the present invention there is provided a method of producing a trusted identity for a user of a trusted computing platform adapted to assure third parties interacting with the computer platform that the computer platform operates according to an indicated specification comprises the steps of: sending at least one existing identity certificate of the trusted computing platform and personal data of the user to a certification authority, the certification authority then verifing the or each identity certificate and the personal data, on successful verification the certification authority producing at least one new identity certificate incorporating at least some of the personal data and sends the or each new certificate to the user.

The personal data may be included in the or each existing identity certificate sent to the CA.

The new certificate may be an amended existing certificate.

The new certificate may be sent to the user with a new private key.

The new identity certificate preferably includes a label and a public key, together with the personal data. The label is preferably a textual string, which may be an alphanumeric string, and is preferably chosen by the user.

The or each existing identity is preferably signed by a trusted device (TD) of the TCP.

The new identity certificate is preferably anonymous, in that the personal data is vouched for by the CA, the public/private key pair is derived from random numbers and the label is chosen by the user.

Thus, the user can advantageously obtain a new trusted identity based on one or more existing trusted identities and incorporating a subset of a union of the existing trusted identities or simply a union thereof. That new identity can also be underivable from the existing identity or identities on which it is based. Furthermore a third party can trust the new identity based on its trust of the verification performed by the CA.

The personal data may be personal credentials of the user. The personal credentials may be personal details or information relating to the user, which may include, age, occupation, income, gender, interests, details of membership of groups, clubs etc and/or possession of bank/credit cards, property etc.

The personal data may be used to allow a user to obtain benefits in the form of discounts from third parties, credit points and/or preferred status.

The new identity is preferably formed with a view to obtaining said benefits. The personal data in the new identity is preferably chosen to obtain said benefits.

The personal data may be one or more trust values, which may be a numerical benefit and/or credits and/or points already accrued or owned by the user. The numerical value and/or credits and/or points may be a bank balance, loyalty card points, a credit worthiness score, a level of credit worthiness or the like.

The personal data may be copyable, for example credit worthiness, always the case for personal credentials or may be non-copyable, for example a number of credit points or a bank balance in the case of some trust values.

The copyable personal data may be copied from an existing identity of the user to the new identity by the CA.

The non-copyable personal data may be transferred, collated and/or divided by the CA between identities or into one or more new identity certificates.

Thus, the CA can advantageously verity to a third party that a user has a given trust value, which may be an amount of credit or points etc, and can transfer those points in a trusted protocol between a user's identities.

The user may be the CA. An issuer of the existing identities may be the CA.

According to a second aspect of the present invention there is provided a trusted computing platform adapted to assure third parties interacting with the computer platform that the computer platform operates according to an indicated specification and having at least one existing identity certificate and being operable to send said at least one identity certificate and personal data of a user to a certification authority for verification, and in which the computer is operable to receive from the certification authority a new identity certificate incorporating at least some of the personal data.

According to a third aspect of the present invention there is provided a certification authority for providing a trusted identity for a user of a trusted computing platform adapted to assure third parties interacting with the computer platform that the computer platform operates according to an indicated specification, wherein the certification authority is adapted to receive at least one existing identity certificate of the trusted computing platform and personal data of the user, to verify the or each identity certificate and the personal data, and on successful verification, to produce at least one new identity certificate incorporating at least some of the personal data and sends the or each new identity certificate to the user.

All of the features disclosed herein may be combined with any of the above aspects, in any combination.

BRIEF DESCRIPTION OF THE DRAWINGS

Specific embodiments of the present invention will now be described, by way of example, and with reference to the accompanying drawings, in which.

DETAILED DESCRIPTION OF THE INVENTION

Figure 1:
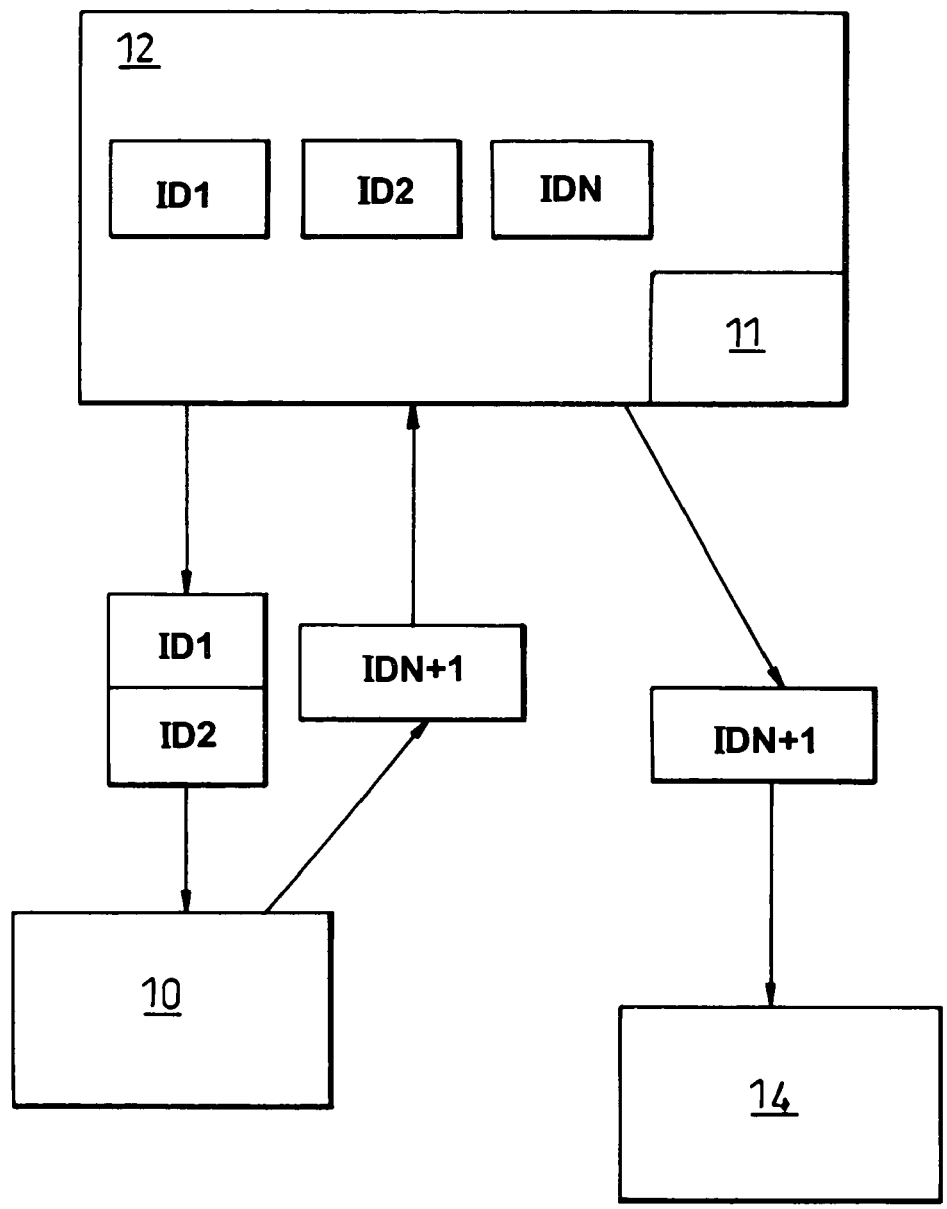
FIG. 1 is a schematic representation of the interaction between a user having various identities and a combined identity, a privacy certification authority and a third party service provider.

The trusted computing platform (TCP) identities referred to above are independent from one another. Thus when applied to a user having different identities a third party is not able to determine how many other identities a given user has.

A trusted certification authority (CA) service is proposed in order to allow a user to control a combination or subset of personal credentials associated with different trusted identities of the user (e.g. ID1, ID2, ... IDN) to create a new identity (IDN+1) that may be used by the user to entitle him to access or obtain a third party service, which may for example be based on discounts, credits and/or loyalty points by virtue of the information contained in one of the user's different trusted identities (ID1 ... IDN).

However, the combined identity must protect other information about the user which it is not necessary to divulge in order to obtain the third party service. Also, the trusted CA service must be trusted in the sense that third party service providers must trust that the personal credentials of the new identity IDN+1 do correspond, at least to a partial extent, to the trusted identity of the user. Furthermore the third party service provider must not be able to infer from the combined identity IDN+1 that any of the identities ID1 to IDN refer to the same individual. Thus, third party service providers are prevented from building up a profile of the owner of these identities, which may have been possible, for example, by using other features of for example IDJ, where J is between 1 and N.

The TCP specification disclosed in WO 00/48063 and further disclosed in the Trusted Computing Platform Alliance (TCPA) specification, see for example www.trustedpc.org, discloses a platform identity that is not a simple serial number, but a cryptographic key and certificate. The platform identity disclosed can be verified by a trusted certification authority (CA), which confirms that the platform conforms to the specification without revealing anything else about the platform or its user. A platform may have several identities which might be used for interactions with different parties. Each platform that is party to a transaction can check the other's identity to verify that the other is a trusted platform and is working as expected. In the TCP/TCPA specifications such identities remain completely separate and there is no mention of how a user might be able to combine or subdivide such identities in order to achieve benefits for protecting their privacy as far as possible.

It is the inventive realisation in the present specification that the different identities of platforms allowed by the TCP/TCPA specifications can be used to allow different identities of user, each independently verifiable by a CA based on the cryptographic key and certificate used to define the identities ID1 to IDN mentioned above. These identities can include personal credentials of the user, such as age, gender, interests, personal information etc, as described in the first embodiment. In the second embodiment below the identities include trust values, such as credit rating, bank balance, a number of loyalty points, which values have generally been assigned on the basis of purchases or deposits made to a certain value. Personal credentials are different to trust values; a trust value may be a specific quantity of a personal credential, e.g. a personal credential may be the possession of a credit limit, whereas the trust value may be a credit limit of £1000.

In the first embodiment a CA is used to associate one or more of a user's identities with personal credentials of the user and to provide a certification service to certify that the personal credentials are correct. The personal credentials for example may be that a person is an academic, belonging to a certain company, the person's year of birth, field of job, job description or other such information which may include income, interests etc.

A user would not necessarily wish every identity to be associated with the same personal credentials.

A new identity could be created either at the same time as the TCP identity creating process conducted initially as described in the TCP specification and the TCPA specification or the new identity could be created afterwards. A new identity and its associated certificate might be valid only for a certain time, in cases where the feature certified by the new identity is likely to be a temporary one.

Figure 2:
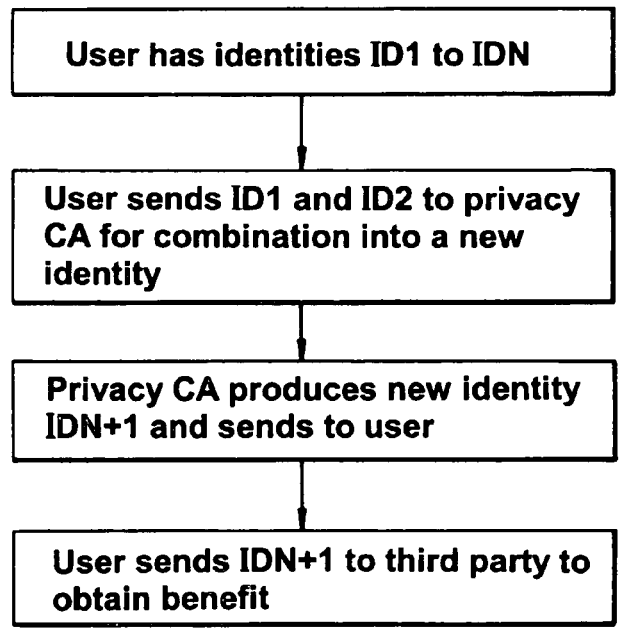
FIG. 2 is a flow diagram of the steps involved in a first embodiment of the invention.

As shown in FIGS. 1 and 2, an implementation of a first embodiment is described below.

In a situation where a user saw a benefit in combining one or more of his personal credentials in order to receive a more beneficial third party service, he would choose a privacy CA 10, which might be the same as a standard CA that issued his original identity certificate. Such a privacy CA 10 may be an employer, a consumer association or other independent and trusted body. This privacy CA would inspect the certificates corresponding to the various identities, e.g. ID1 to IDN to be combined. The privacy CA 10 would then enter into a protocol with a customer, which would be an extended TCP protocol, extended by adding the personal credentials of the user. The protocol also involves a trusted device (TD) 11 of the user, which TD 11 is located on the user's TCP 12 and is the source of the trusted identities. The protocol would result in a new identity, IDN+1 being issued, which identity is associated with some sub-set, specified by the user, of the union of the personal credentials associated with the various identities ID1 to IDN, or a partial set of one of the identities of the user.

The protocol is implemented as follows. In the TCP specification and the TCPA specification, the platform identity, or the user's identity, ID1 to IDN, is a cryptographic identity, based upon an asymmetric encryption algorithm, such as the well known RSA algorithm used for public key infrastructures (PKI). The public part of the platform identity is a digital certificate, containing a label and public key, all digitally signed by the privacy CA 10. At the owner's discretion, the public part is distributed. The private part of that identity is a private key, which is a secret known only to the TD 11 inside the user's TCP. To prove that some particular data originated at a particular TCP, the TCP 12 creates a digital signature over that data, using its signature key. The TCP 12 sends the data, plus the signature, plus the certificate to a peer entity, which in this case would be a third party service provider 14, which then verifies the trustworthiness of the certificate by inspecting the signature on the certificate. Next, the service provider 14 uses the public key inside the certificate to verify the origin and integrity of the data.

The user may obtain as many of these identities as he wishes based on different combinations of his personal credentials. The keys are necessarily derived from random numbers. The label is any textual string chosen by the user. Consequently, the identities are anonymous.

Using the TCP techniques set out in the prior application referred to above and in the TCPA specification, the privacy CA 10 chosen by the user of a TCP 12 uses the TCP credential and endorsement credential to verify that a platform is a trusted platform with a genuine TD 11. The privacy CA 10 also checks that certain features pertaining to the user are in force and therefore that the privacy CA 10 is willing to attest to identities of that TCP 12 (or user) associated with these features. In particular, the privacy CA 10 attests to the TD's 11 identity by creating information that binds the identity key to various identity labels and information about the platform and the Trusted Platform Subsystem (TPS—as described in the TCPA specification) and selected features. Only the privacy CA 10 can trace the personal credentials in the identity back to the owner (user). Preferably, on request by the user, the privacy CA 10 collates a subset of these personal credentials and creates a new identity (IDN+1) that binds the identity to a new label chosen by the user, and information about the platform and the subset of the personal credentials.

It is important that the certificate corresponding to the new identity does not explicitly refer to any of the identities ID1 to IDN. The user can then use IDN+1 in transactions by sending the corresponding certificate for identity IDN+1 to a potential third party service provider 14, who can then verify that the identity corresponds to a TCP 12 and will trust that the user has the associated personal credentials if he trusts the chain of trust in what may be a number of CAs leading up to the privacy CA 10 that issued the identity certificate for IDN+1.

Such a process can be used many times, thereby building up a hierarchy of identities from which a user, or a user's agent, can select for use in a particular purpose. A user should ensure that a privacy CA's 10 policy concerning the use and any disclosure of his identities meets the users own privacy requirements. It may be possible for a user to act himself as a privacy CA if he has sufficient credibility, or does not need to prove himself to other parties. The issuer of the identities on the TCP may also be the privacy CA.

The ability to provide combined personal credentials as described above is a benefit in situations where certain criteria have to be satisfied by a user in order for him to be eligible for a particular service, discount, credit, loyalty point or the like. Examples include academics is being given a discount of 10% on computer goods, loyalty points being offered in return for surveys completed by people under 25 working for a hi-tech company, online financial advisors attracting the interest of people earning more than £50,000 with online current bank accounts, many more examples are possible.

It is also possible to provide different levels of intended privacy to a user who wishes to create a new identity. The privacy CA 10 may in its policy offer different levels of privacy for combined identities, such levels of privacy may be offered for example in a low level for a user's occupation, or a high level for personal information relating to the user or the ability to access confidential records of the user.

Figure 3:
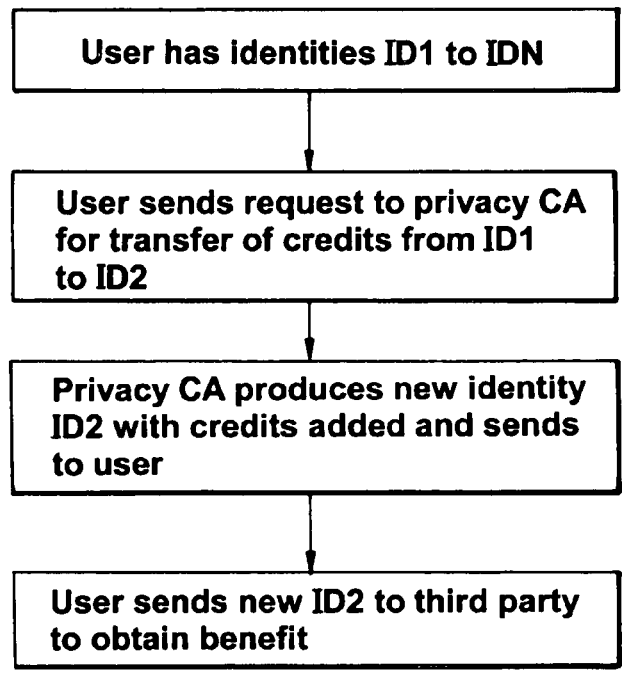
FIG. 3 is a flow diagram of a second embodiment.

FIG. 3 shows a second embodiment of the invention, which relates to the combination or transfer of trust values of the user, rather than the personal credentials described in the first embodiment. The difference between the two is described above.

A particular implementation of the second embodiment also uses multiple user identities for a user of the TCP 12. One example of a combination of credentials or transfer of credentials would be for transfer of credit or credit status between trusted identities ID1 and ID2, both of which belong to the user, without revealing the relationship between the identities. Thus, the identities described above could be used in order to set up a new trusted identity with a particular credit clearance (trust value), certified by the privacy CA 10.

New trusted identities are initially a blank start for a customer in the sense that the identity must work to gain preferred status from retail companies. An existing trusted identity of a user may have already achieved such status. The problem arises that the user may accumulate credits (trust values) with concurrently existing identities relating to the same person. If the customer wishes to use a separate identity, a trusted service, such as the trusted privacy CA 10 disclosed above, is needed to allow appropriate transfer of trust-related credit (trust values) from one identity to another to create a new or updated identity. It is also important to protect the anonymity of the customer, but at the same time the third party service provider 10, or retail company must trust that the credits (trust values) associated with the identity are trustworthy.

Currently, retail trust related credit is tied to a specific account or an individual and transfer of such credit neither involves trusted identities nor allows the owner to remain anonymous. In particular, there are privacy concerns related to retailers building up detailed profiles of customers and collating and/or selling such information. Such privacy concerns are avoided in that the TCP specification and the TCPA specification allows owners of trusted platforms to have multiple anonymous trusted identities. However, the TCP/TCPA specifications do not deal with the issue of transferring trust-related credit (trust values) between these identities. Consequently, this invention relates to the transfer of accumulated credit anonymously in such a way that the retailer or third party service provider 14 cannot link the identities ID1 to IDN from which the trust is being transferred, but can nevertheless be sure of the status of that identity.

A trusted identity, e.g. ID1, that is used in e-commerce may gain "credit" in the eyes of retailers of two main types. A first type is a copyable type of credit, such as security clearance rating, financial credit rating, frequent flyer status. The second type would be a non-copyable type of credit, for example an outstanding balance on an account, vouchers, loyalty points (e.g. air miles), which have an absolute value that cannot be shared or reproduced, other than by division.

A user may wish to set up a new identity, IDN+1, that hides links with other identities to the retailer and yet may wish to adopt those credits from them. Alternatively, a user may wish to transfer credits within existing identities, ID1 to IDN. It is important to ensure that any such transferring is done in a trusted way by specific software trusted by all parties.

Methods by which the software can protect a user identity include delaying crediting a new identity after the first identity has been debited, splitting non-copyable credits, or sharing them between several new identities.

The person may wish to set up a new identity, IDN+1, that immediately has copyable credit, e.g. credit rating for a particular retailer. The user may also wish to set up a new identity and close down the old one and copy across all types of credit. Also, a user rust be prevented from transferring non-copyable credit to other identities.

In order to implement the above, the privacy CA 10 referred to above provides the solution in that trust related retail information (trust values) for example associated with an identity may be migrated to another identity, preferably on the request of the owner of the original identity. The privacy CA 10 will need to check that the customer relating to the first identity has given permission, which it can check either from information received during the process of setting up such identities itself, or else from corresponding with an issuing CA of the public identity TCP certificates, mentioned above. The privacy CA 10 also needs to check that the type of trust value is copyable and further, that it is appropriate to copy this to a second identity. Such copying may be generalised to copy across multiple identities, for example in a corporate environment such that all employees are accorded staff benefits.

The privacy CA 10 can then certify to third party service providers 14 that the appropriate level of trust values is indeed associated with the second identity, but not reveal exactly how this came to be or reveal details about the customer relating to the second identity.

Whether the third party service provider 14 trusts this information will depend on whether the third party service provider 14 trusts the privacy CA 10. In the event of a change of status, e.g. credit status, of the initial identity, the trusted privacy CA 10 would ensure that the status of each additional identity is changed accordingly.

The new identity IDN+1 may give a passport into an Internet chat room, may allow the owner of that identity to obtain rewards, discounts, to answer questionnaires and to receive corresponding awards, or to allow a user to have information targeted at that identity, without revealing the remainder of his identity facets.

In the above the first embodiment addresses the problem of how to prove personal credentials of an individual in order to obtain access to third party services by proposing credential combination or subdivision.

The second embodiment addresses the problem of how to set and associate (perhaps differing) levels of trust with different identities by copying or transferring trust values.

Although the description above has been given in relation to the trusted computing platform specification of the present applicant, this invention would also be applicable to different types of trusted platform and trusted device.

The invention claimed is:

1. A method of producing a trusted identity for a user of a trusted computing platform adapted to assure third parties interacting with the computer platform that the computer platform operates according to an indicated specification comprising:
    sending at least one existing identity certificate of the trusted computing platform and personal data of the user to a certification authority,
    the certification authority then verifying the at least one existing identity certificate and the personal data,
    on successful verification the certification authority producing at least one new identity certificate incorporating at least some of the personal data and sends the at least one new identity certificate to the user.

2. A method as claimed in claim 1, in which the personal data is included in the at least one existing identity certificate sent to the certification authority.

3. A method as claimed in claim 1, in which the new certificate is all amended existing certificate.

4. A method as claimed in claim 1, in which the new certificate is sent to the user with a new private key.

5. A method as claimed in claim 1, in which the new identity certificate includes a label and a public key, together with the personal data.

6. A method as claimed in claim 1, in which the at least one existing identity is signed by a trusted device, being a hardware trusted component physically and logically resistant to unauthorised modification, of the trusted computing platform.

7. A method as claimed in claim 1, in which the new identity certificate is anonymous, in that the personal data is vouched for by the certification authority, the public/private key pair is derived from random numbers and the label is chosen by the user.

8. A method as claimed in claim 1, in which the personal data is at least one personal credential of the user.

9. A method as claimed in claim 8, in which the at least one personal credential includes personal details or information relating to the user.

10. A method as claimed in claim 9, in which the personal data is used to allow a user to obtain benefits in the form of discounts from third parties, credit points and/or preferred status.

11. A method as claimed in claim 1, in which the personal data is one or more trust values.

12. A method as claimed in claim 11, in which the trust values include numerical values, credits, points, or a combination thereof which may be a bank balance, loyalty card points, a credit worthiness score, or a level of credit worthiness.

13. A method as claimed in claim 11, in which the personal data is copyable.

14. A method as claimed in claim 13, in which the copyable personal data is copied from an existing identity of the user to the new identity by the certification authority.

15. A method as claimed in claim 13, wherein the personal data is credit worthiness.

16. A method as claimed in claim 11, in which the personal data is non-copyable.

17. A method as claimed in claim 16, in which the non-copyable personal data is transferred, collated, divided, or a combination thereof by the certification authority between identities or into one or more new identity certificates.

18. A method as claimed in claim 16, wherein the personal data is a number of credit points or a bank balance.

19. A trusted computing platform, including a processor and a memory, adapted to assure third parties interacting with the trusted computing platform that the trusted computing platform operates according to an indicated specification and having at least one existing identity certificate and being operable to send said at least one identity certificate and personal data of a user to a certification authority for verification, and in which the trusted computing platform is operable to receive from the certification authority a new identity certificate incorporating at least some of the personal data.

20. A certification authority, including a processor and a memory, for providing a trusted identity for a user of a trusted computing platform adapted to assure third parties interacting with the computer platform that the computer platform operates according to an indicated specification, wherein the certification authority is adapted to receive at least one existing identity certificate of the trusted computing platform and personal data of the user, to verify the at least one existing identity certificate and the personal data, and on successful verification, to produce at least one new identity certificate incorporating at least some of the personal data and sends the at least one new identity certificate to the user.

* * * * *

UNITED STATES PATENT AND TRADEMARK OFFICE
CERTIFICATE OF CORRECTION

| | |
|---|---|
| PATENT NO. | : 8,370,631 B2 |
| APPLICATION NO. | : 10/208716 |
| DATED | : February 5, 2013 |
| INVENTOR(S) | : Siani Pearson |

It is certified that error appears in the above-identified patent and that said Letters Patent is hereby corrected as shown below:

In the Claims:

In column 7, line 64, in Claim 3, delete "all" and insert -- an --, therefor.

Signed and Sealed this
Seventh Day of May, 2013

Teresa Stanek Rea
*Acting Director of the United States Patent and Trademark Office*